United States Patent [19]

Alberino et al.

[11] Patent Number: 4,810,444
[45] Date of Patent: Mar. 7, 1989

[54] METHOD FOR MAKING MAT-MOLDED RIM PARTS

[75] Inventors: Louis M. Alberino, Cheshire; Peter S. Carleton, Branford; Douglas P. Waszeciak, North Haven, all of Conn.

[73] Assignee: The Dow Chemical Company, Midland, Mich.

[21] Appl. No.: 59,436

[22] Filed: Jun. 8, 1987

[51] Int. Cl.[4] .................... B29C 43/04; B29C 45/00; B29C 45/34

[52] U.S. Cl. .................... 264/102; 264/257; 264/328.6; 264/328.7; 264/331.19

[58] Field of Search .............. 264/101, 102, 257, 258, 264/2.2, 331.19, 328.1, 328.6, 328.8, 328.2, 328.7, 328.9

[56] References Cited

U.S. PATENT DOCUMENTS

| | | | |
|---|---|---|---|
| 2,478,013 | 8/1949 | Roddy | 264/328.6 |
| 3,206,352 | 9/1965 | Gollis et al. | 521/902 |
| 3,644,168 | 2/1972 | Bonk et al. | 521/51 |
| 3,903,018 | 9/1975 | Kolakowski et al. | 521/902 |
| 4,003,859 | 1/1977 | Reymore et al. | 521/90 |
| 4,011,180 | 3/1977 | Lockwood et al. | 521/902 |
| 4,256,444 | 3/1981 | Suter | 264/102 |
| 4,256,689 | 3/1981 | Gardner | 425/558 |
| 4,314,955 | 2/1982 | Boden | 264/328.6 |
| 4,439,386 | 3/1984 | Antczak | 264/102 |
| 4,489,033 | 12/1984 | Uda | 264/328.7 |
| 4,524,044 | 6/1985 | Nishiyama | 264/328.6 |
| 4,526,905 | 7/1985 | Lucast | 264/328.8 |
| 4,540,534 | 9/1985 | Grendol | 425/558 |
| 4,556,529 | 12/1985 | Muser | 264/257 |
| 4,618,466 | 10/1986 | McGlashen | 264/328.7 |
| 4,692,291 | 9/1987 | Angell | 264/120 |
| 4,714,575 | 12/1987 | Preston | 264/257 |

OTHER PUBLICATIONS

Advances in Urethane Science and Technology, R. J. Lockwood and L. M. Alberino 8, pp. 171 to 183, Technomic Publishing Co.
Reinforced Plastics/Composite Institute, SPI, Session 5-E. R. D. Farrin et al., pp. 1 to 6, Jan. 11 to 15, 1982.

Primary Examiner—James Lowe
Assistant Examiner—Jeremiah F. Durkin, II
Attorney, Agent, or Firm—James S. Rose

[57] ABSTRACT

A process for the preparation of molded high strength composites comprising fibrous reinforcing material impregnated with a reaction injection molded polyisocyanurate resin. The process comprises first evacuating a mold containing the fibrous reinforcing material said mold equipped with means for accepting an overflow volume of the resin. The mold system is pressurized prior to gelation causing the overflow volume to be forced into a final volume. The molded composites have a high flexural moduli, good physical properties, low void content and smooth surface.

17 Claims, 2 Drawing Sheets

METHOD FOR MAKING MAT-MOLDED RIM PARTS

FIELD OF THE INVENTION

This invention relates to mat-molded RIM (reaction injection molded) parts and is more particularly concerned with high strength composites prepared from polyisocyanurate resins.

DESCRIPTION OF THE PRIOR ART

The use of polyisocyanurate resins for lamination and molding purposes has long been known. For example, U.S. Pat. No. 3,206,352 discloses the preparation of polyisocyanurate resins for laminating layers of glass fabric together in the making of composites. U.S. Pat. No. 3,644,168 discloses molded polyisocyanurate resinous bodies having reinforcing webs of, inter alia, fibrous materials. The reinforced bodies so prepared are characterized by an integrally formed microcellular skin and an inner cellular core.

U.S. Pats. Nos. 3,903,018, 4,003,859, and 4,011,180 disclose novel catalyst combinations in the preparation of, inter alia, solid polyisocyanurate moldings optionally including reinforcing layers of heat resistant fabric such as glass fabric, graphite fabric, and the like.

The advantages inherent in a RIM composite made with chopped fiber glass mats and polyisocyanurate resin is disclosed in Advances in Urethane Science and Technology, Vol. 8, pp. 171 to 183 by R. J. Lockwood and L. M. Alberino, Technomic Publishing Company, Westport, Conn.

Some serious problems have been encountered in this technology of molding, and, particularly reaction injection molding, of resins around reinforcing mats. Two such problems are the movements of the mat(s) during the mold filling step and void content in the resultant part due to poor fiber wet-out. High void content is the most troublesome and gives rise to parts having poor cosmetic appearance and surface roughness as well as inferior physical properties.

Sheet molding compound (SMC) and bulk molding compound (BMC) technology, in some cases, first evacuates the mold prior to filling with subsequent pressure application to the mold. This technique has been successfully applied in the preparation of structural parts from epoxy RIM using preplaced reinforcement; see preprints of the 37th Annual Conference, Reinforced Plastics/Composite Institute, SPI, Jan. 11 to 15, 1982, pp. 1 to 6, session 5-E by R. D. Farrin et al. The maximum pressures employed in this process are from 12 to 20 psi.

In spite of the advancement of mat molded (MM) technology of polyisocyanurate resins and what has been learned and disclosed in regard to other MMRIM resins, there still remains a need for a process for the preparation of MMRIM polyisocyanurates which avoids the above problems and lowers or even eliminates void content in the molded parts.

SUMMARY OF THE INVENTION

The present invention is directed to a process for the preparation of a high strength composite comprising fibrous reinforcing material inpregnated with a reaction injection molded polyisocyanurate resin said process comprising:

1. providing a mold containing said fibrous reinforcing material and said mold equipped with means for decreasing an overflow volume of polyisocyanurate resin forming ingredients received to a final volume of said ingredients;
2. evacuating said mold;
3. injecting into said evacuated mold said resin forming ingredients in an amount in excess of that required to fill said final volume thereby causing said overflow volume;
4. pressurizing said mold prior to gelation of said resin forming ingredients thereby causing a decrease in at least a portion of said overflow volume; and
5. maintaining said pressure at least until said gelation has occurred.

This invention is also directed to the high strength composites prepared by the above method.

The term "high strength" in reference to the present composites means a composite having a flexural modulus of at least 300,000 psi as determined in accordance with ASTM D-79 Test Method I Procedure A.

Surprisingly it has been found that a particular modification of the prior art epoxy MMRIM process will allow for the preparation of the high strength polyisocyanurate composites in accordance with the present invention. The surprising feature is the fact that the pressure range disclosed for the epoxy resins is too low for present polyisocyanurate resins. The latter require a minimum pressure which exceeds that required in the art.

DETAILED DESCRIPTION OF THE INVENTION

The process of the invention can be practiced using any of the RIM procedures, apparatus, and appropriate ingredients set forth in the prior art for preparing molded composites of either polyurethane or polyisocyanurates in combination with the novel molding steps discussed below. Particular reference to RIM composite techniques is directed to Advances in Urethane Science Technology cited supra; and to U.S. Pat. Nos. 4,272,618, 4,296,212, 4,374,210, 4,433,067, 4,435,349, and 4,546,114 which patent disclosures relative thereto are incorporated herein by reference.

The novel aspects of the present process, in their broadest scope, reside in first evacuating a mold containing a fibrous element which mold is equipped with means for receiving an overflow volume of injected polyisocyanurate resin forming ingredients, and, by the application of same type of pressure, causing at least a portion of the overflow resin to be forced into a final volume prior to resin gelation. The term "overflow volume" means the volume of ingredients in excess of the final mold volume desired. The term "final volume" means the volume after pressure application has forced the resin ingredients into their final desired volume. A clearer understanding of the scope of these terms will become evident as the following discussion progresses.

It will be evident from the above description that some modifications of the more conventional RIM tooling are required to practice the present process. While the conventional materials for molds are employed (i.e. aluminum, steel, steel alloys, kirksite, metal filled epoxy, electroform nickel/copper, and the like) along with the conventional attachment of the RIM head, the molds themselves must be capable of holding vacuums and withstanding pressure greater than atmospheric. This can be typically accomplished by employing gasketed molds, or, alternatively, by using molds with movable mold covers of low draft angles and close tolerances between cover and mold proper. Further, the molds must have some means for evacuation and pressure application both of which are independent of the RIM head. Generally speaking, the particular means used for evacuating or pressurizing the mold will be governed somewhat by the means employed for receiving the overflow volume of resin. In their simplest embodiment the molds can be equipped with separate outlet and inlet valves leading to vacuum and pressure sources respectively. Alternatively, the valves can be combined in one three-way valve.

The first step after the reinforcing material is placed in the mold is to apply vacuum to the whole system. Advantageously, the vacuum employed falls within a range of from about 0.01 mm to about 50 mm, preferably from about 0.1 mm to about 10 mm. The source of the vacuum is then closed by the valve means followed by injecting the resin forming ingredients through the RIM head.

The overflow volume of ingredients as defined above represents an excess over the mold volume proper. While a broad range of excess resin will provide the increased benefits in accordance with the present invention, the advantageous amounts will be governed not only by economic considerations but by the practical limitations of equipment size and the like. Accordingly, the overflow volume, generally speaking, will fall within a volume of from about 2 to about 15 percent of the final mold volume. Preferably, from about 4 to about 10, most preferably, from about 5 to about 8 percent.

The means for receiving an overflow volume of ingredients from the RIM shot and subsequently forcing at least a portion of it to said final volume is not limited to any one particular method. In one illustrative embodiment, the mold is equipped with an attached reservoir characterized by the broad and preferred overflow volume ranges set forth above and the whole system evacuated within a pressure range also set forth above. With the vacuum source closed, the resin ingredients are injected into the mold with the overflow entering the reservoir. Immediately upon completion of the injection and before resin gelation, pressure is applied to the reservoir preferably at its top at a point farthest from the latter's attachment to the mold. Thus, at least a portion of the overflow resin is forced back into the mold proper before it gels and the pressure is maintained at least until gelation does occur.

In respect of the pressure to be applied, it must be at least 50 psi to accomplish the unexpected benefits derived from the process according to the present invention. There is no upper limit on the pressure other than the dictates of practical and economic mold construction. Advantageously, the pressure will fall within a range of from about 50 to about 300, preferably from about 100 to about 200, and, most preferably about 125 to about 175 psi.

It should be noted that the reservoir volume and overflow volume need not be equal. Notably, the overflow volume of resin ingredients need not completely fill the reservoir volume. However, it is preferable that the reservoir volume be filled and the amount of the RIM shot gauged accordingly. On the other hand, it is not essential that if the reservoir is completely filled with resin that it all be forced back into the mold as the final volume. It is well within the scope of the present invention for the final volume to include a portion of the reservoir volume in addition to the mold volume proper. The actual amount of resin forced from the reservoir will depend, inter alia, on the actual volume of the reservoir originally chosen, on the amount of fibrous reinforcing material to be saturated with resin (i.e. void-content to be overcome), the mold configuration, the resin gel time, and the like. In a preferred embodiment at least about half of the reservoir contents are forced back into the mold proper. More preferably, from about 50 to about 100 percent of the reservoir contents are forced back into the mold.

Preferably, the reservoir is fitted with a three-way valve at its top which is situated farthest from its attachment to the mold. The three-way valve is connected to a vacuum source and a source of gas under pressure. Since gas is the pressure source, the cylinder is not particularly restricted to shape. Optionally, it can be cylindrical, conical, and the like. It will be recognized by one skilled in the art that when the overflow volume decreasing means is effected by gas pressure with the resin ingredients being liquid, it is necessary for the reservoir to be situated on top of the mold. Preferably, it is situated at a mid-point in the mold in order to optimize the equal spread of resin throughout the fibrous reinforcing material.

The type of gas employed is not critical provided it is inert to the resin ingredients and that it can be provided within the pressure ranges set forth above. Illustratively, the gases are air, nitrogen, argon, helium, and the like.

In yet another illustrative embodiment of the present process the overflow volume decreasing means is provided by a cylindrical reservoir having a hydraulically or pneumatically driven piston working in cooperation with the reservoir wherein the piston operates to force the resin ingredients into the final volume. The same ranges of vacuum and pressure set forth above apply equally to this embodiment. There is no particular limitation as to the placement of the reservoir on the mold. Accordingly, because a liquid sealed piston is driving the material into a smaller (final) volume, the reservoir can be placed on the sides, bottom, or top of the mold. Preferably, the reservoir is attached to the top or mold cover.

In still another illustrative, but less preferred embodiment, instead of employing a reservoir and a pressure source, the mold is equipped with a movable closure or mold cover so that an initially over-size mold serves as its own overflow volume. That is to say, the mold is evacuated, charged with the ingredients to completely fill the mold void and thereafter the ingredients compressed to a final volume by appyling a mechanical force to move the mold cover farther into the mold. It will be readily apparent to one skilled in the art that in this embodiment there is no limitation in respect of whether the mold cover is operated in a downward, sideways, or upward configuration provided the vacuum and pressure ranges fall within the values set forth above. It will also be readily apparent that this embodiment calls for much stricter attention to machine detail in that the movable cover and mold must have close tolerances, for example, of the order of 0.001 mm and, additionally have a low draft angle so that as the cover moves into the mold it operates to form a closer seal between the metal surfaces.

Figures 1, 1A, 2, 2A:
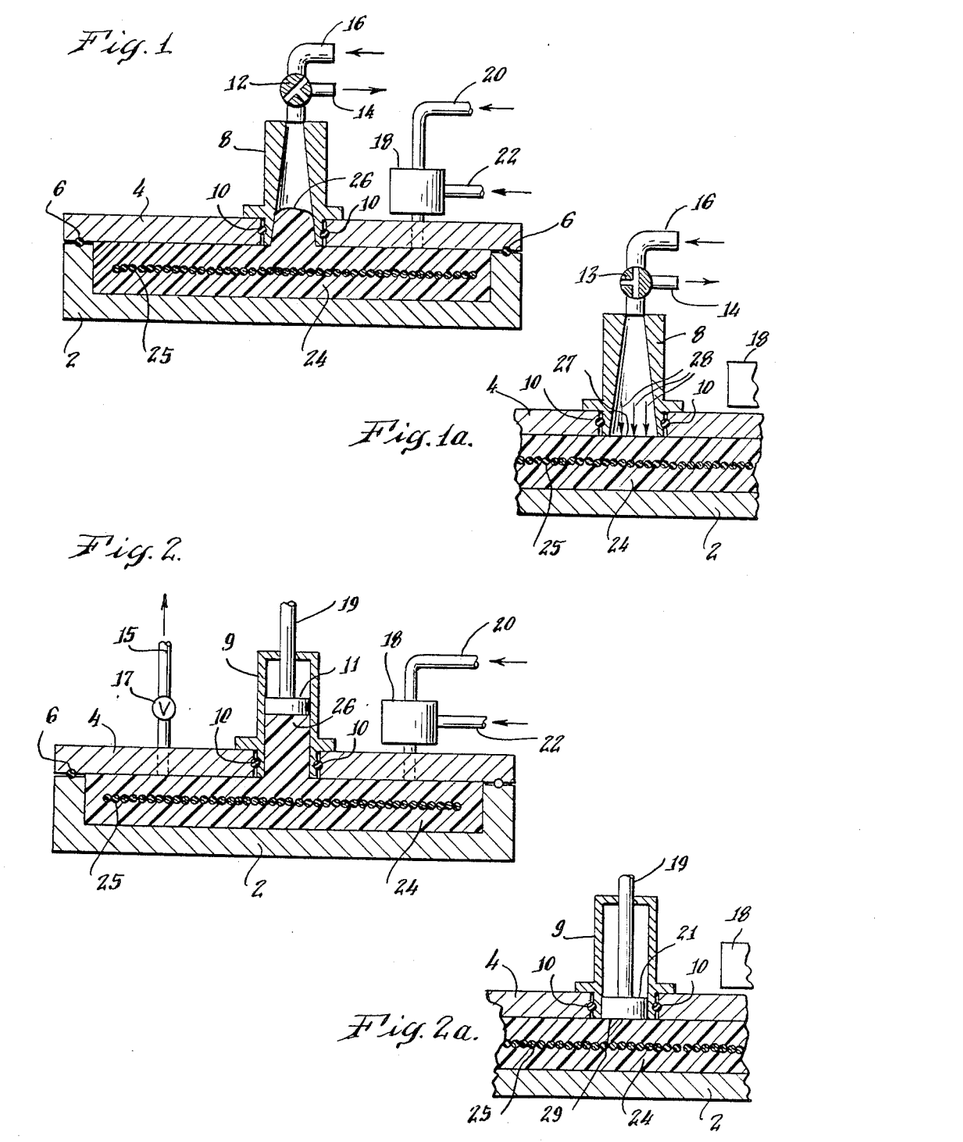
FIG. 1 shows a cross-sectional view of one particular embodiment of the invention prior to a gas pressure application step to the resin forming ingredients.
FIG. 1a shows a partial cross-sectional view of the embodiment of FIG. 1 after a gas pressure application.
FIG. 2 shows a cross-sectional view of another particular embodiment of the invention prior to a piston pressure application step to the resin forming ingredients.
FIG. 2a shows a partial cross-sectional view of the embodiment of FIG. 2 after piston pressure application.

In FIG. 1 there is shown, in cross-sectional view, a specific embodiment of a composite prepared in accordance with the invention at that stage of the process subsequent to the evacuation and RIM shot but prior to the pressurizng step. The metal mold (2) and mold cover (4) are held in vacuum/pressure retention by clamps not shown and with vacuum/pressure gasketing (6). The reservoir (8) is a steel cylinder having a conical chamber attached to the mold cover by bolts not shown and with vacuum/pressure gasketing (1). The top of the reservoir is fitted with a three-way valve (12) shown in the closed-off position after a vacuum has been pulled. Vacuum (14) and pressure (16) lines are shown in connection with the three-way valve. The RIM mix head (18) along with its resin ingredient feed lines (20) and (22) is attached to the mold cover. The non-gelled resin forming ingredients (24) are shown with an overflow volume (26) up in the reservoir (8). A single fibrous mat (25) is shown within the liquid ingredients (24).

FIG. 1a shows a partial cross-sectional view of the composite of FIG. 1 after the three-way valve has been opened to the pressure position (13). The overflow volume of resin is shown as forced into the final volume before gelation so as to coincide with the overall mold configuration at (27) by the gas pressure shown by lines (28). It will be recognized that the mold body configuration depicted by (27) is not obtained to such exact shape.

FIG. 2 shows yet another cross-sectional view of a specific embodiment differing from FIG. 1 by the reservoir being cylindrical (9) with a piston (11) in cooperation with the cylinder and in a mold charging position. Vacuum (15) has been pulled through valve (17) which is closed followed by the resin ingredients injected through (18) and this time to completely fill the mold and reservoir (26) all the way up to the piston (11).

FIG. 2a shows a partial cross-sectional view of the composite of FIG. 2 after the piston rod (19) has been actuated to force the piston into the pressurizing position (21) thereby forcing the non-gelled resin to the final volume (29) conforming to the general mold configuration.

Figure 3:
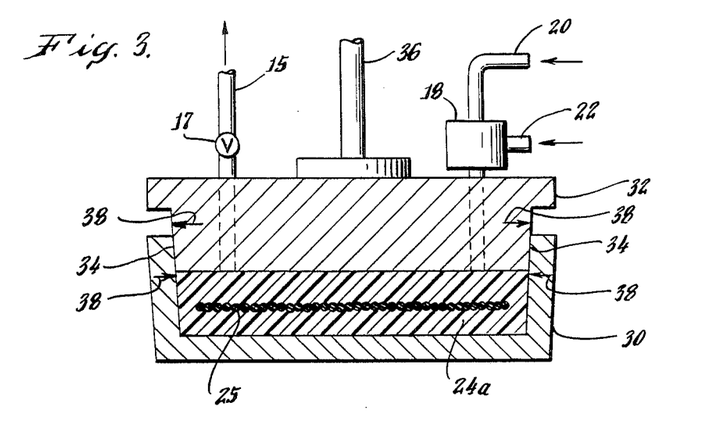
FIG. 3 shows a cross-sectional view of yet another particular embodiment of the invention prior to compressing the resin forming ingredients by a movable mold cover.

FIG. 3 shows still another cross-sectional view of a specific embodiment wherein the metal mold (30) has a movable cover (32) shown equipped with the RIM head along with a vacuum source (15) with valving (17) and a mechanically or hydraulically driven arm (36) for compressing the mold cover deeper into the mold prior to resin gelation. The cover is shown in a first position after the evacuated mold is filled but prior to gelation of the resin (24a) which latter includes the overflow volume. The machining of the mold and cover is such that close tolerances and a low draft angle are represented at (34). Imaginary reference marks are shown at (38) on both mold cover and mold so as to better define cover position relative to the mold. The overflow volume of resin is represented by the volume defined between the mark (38) on the mold and the bottom of the cover.

Figure 3A:
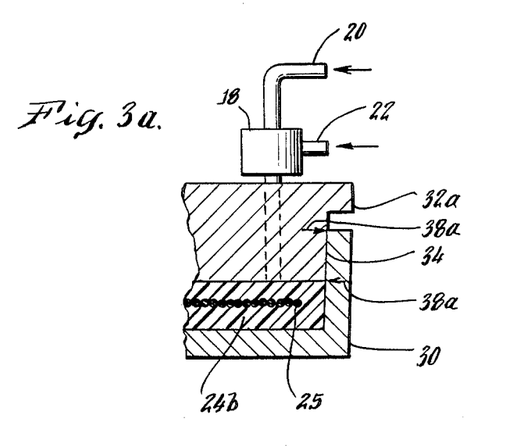
FIG. 3a shows a partial cross-sectional view of the embodiment of FIG. 3 after said mold cover has been moved into the mold.

FIG. 3a shows a partial cross-sectional view of the composite of FIG. 3 after the arm (36) has moved the cover to its second position (32a) prior to resin gelation. The overflow volume of resin has been compressed and decreased to the final volume (24b). The imaginary reference marks now show at (38a) the movement of the mold cover relative to the mold and this defines the final resin volume.

The term "composite" as it refers to the products made in accordance with the present invention has the significance generally accepted in the molding art to include the use of fibrous matted material embedded into, or impregnated with, the resin component which in the present case is a polyisocyanurate resin. The term does not include loose fibrous material. The term includes in its scope mat molded RIM (or MMRIM) articles. Additionally, included in the present process are the use of filled or reinforced RIM (RRIM) articles. However, this aspect of the present invention is better discussed below in respect of the polyisocyanurate ingredients.

The term "fibrous material" does mean a fibrous material in the form of a mat. The fibrous components are held within the mat form either by the use of a polymeric adhesive such as a polyester, polyepoxide, and the like, or else by being woven or stitched accordingly. The fibrous arrangement in the mat can be random, roving, oriented, and the like. Illustratively the fibrous material can be glass fiber, or an organic fiber inclusive of graphite fiber, polyester fiber, polyamide fiber, polyaramid fiber, and the like. The above fibrous materials are meant to be exemplary only with the present process not limited soley to these examples. Any fibrous mat material can be employed in the present method. Although glass fibrous material is most preferred.

At least one mat is employed in the process of the invention and preferably a plurality thereof with the only limitation in numbers being imposed by practical considerations and by the thickness of the molded part being prepared and the thickness of the mats involved. It is also advantageous to employ combinations of at least one organic fiber mat along with the at least one fiber glass mat.

The mats are simply placed in the mold either manually or by a mechanical delivery system prior to placing the mold cover in position.

The weight percent contributed to the composite will vary considerably depending on the type of fibrous material employed. Advantageously, it will fall within the range of from about 10 to about 70 weight percent, preferably from about 25 to about 65 weight percent.

As noted previously one of the major advantages to flow from the present process is the surprising positional stability of the mats within the mold during the RIM process. This give rise to parts having no mat displacement. Also surprising is the very low void content of the molded parts. Such low void contents have heretofore not been attainable in polyisocyanurate based composites. This reduction occurs regardless of a plurality of mats being involved and gives rise to improved physical properties being attainable at lower overall part densities.

Any of the polyisocyanurate resin forming systems disclosed in the art can be employed in the process of this invention. Typical, but non-limiting, of the polyisocyanurate resins are those disclosed in the U.S. patents set forth above and which disclosures relative thereto are already incorporated herein by reference.

While the resin system may comprise the product obtained from trimerizing the polyisocyanate alone to produce a resin having only isocyanurate linkages, it is preferred to employ a minor amount of a polyol. That is to say, the polyisocyanate is trimerized in the presence of less than a stoichiometric amount of at least one polyol component so that the polymerized resin will contain predominantly polyisocyanurate units with lesser amounts of polyurethane. More preferably, the polyisocyanate is an aromatic polyisocyanate. In this connection, it is to be understood that the chemical structure and composition of the resins are not limited solely to the above linkages but optionally can include minor proportions of other units. By minor proportions is meant less than 20 percent, preferably less than 10 percent of other chemical units. Illustratively oxazolidinones can arise from the reaction of minor proportions of monomeric epoxide components with the polyisocyanate; amide, amide-imide or imide linkages from the reaction of polycarboxylic acids, carboxylic acid/anhydride compounds, or dianhydrides with the polyisocyanate; and polyurea linkages from the reaction of organic compounds having from 2 to 8 primary or secondary amine terminated polyethers of greater than 1500 molecular weight wherein greater than 50 percent of the active hydrogens are in the form of amine hydrogens.

Any of the organic polyisocyanates commonly employed in the art for the preparation of molded cellular polyurethanes can be employed herein. Included are those organic polyisocyanates disclosed in the incorporated references. Typically, any of the known organic di- or higher functionality aliphatic or aromatic polyisocyanates can be employed. The preferred class includes the aromatic polyisocyanates.

Illustrative, but not limiting thereof, are 1,6-hexamethylene diisocyanate, 1,4-cyclohexylene diisocyanate, 4,4'-methylenebis(cyclohexyl isocyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 50 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of molecular weight 1000 to 10,000, polytetramethylene glycols of molecular weight 600 to 5000, and polyester polyols of molecular weight 500 to 8000, said polyol and said methylenebis(phenyl isocyanate) being reacted in the proportions of about 0.01 equivalent to about 0.5 equivalent of said polyol per isocyanate equivalent; blends or mixtures of the liquefied methylenebis(phenyl isocyanates) with each other and with the isocyanate terminated prepolymers described above in any proportions desired; polymethylene poly(phenyl isocyanate) mixtures containing from about 20 percent to about 85 percent by weight (preferably about 30 to about 60 percent) of methylenebis(phenyl isocyanate), with the balance of 80 to 15 percent by weight (70 to 40 percent) of the mixtures being polymethylene poly(phenyl isocyanates) of functionality higher than 2; included in the polymethylene poly(phenyl isocyanates) are those having the 4,4'-methylenebis(phenyl isocyanate) isomer and mixtures including up to about 30 percent of the corresponding 2,4'-isomer.

Particularly preferred are the liquefied methylenebis(phenyl isocyanates) described above.

In respect of the polyol component it must have at least 2 hydroxyl groups and a molecular weight from about 400 to about 12,000 and includes polyether polyols, polyester polyol, reinforced or polymer polyols, polycarbonate polyols, resole polyols, polybutadiene based polyols, and the like. Advantageously, the functionality is from about 2 to about 4 with the hydroxyl functionality being predominantly primary. Preferably, the polyols have 2 to 4 hydroxyl groups and a molecular weight from about 400 to about 8000.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. by the polyermization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see Prep. Methods of Polymer Chem. by W. R. Sorenson et al., 1961, page 293. Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the propyleneoxy-polyethyleneoxy capped diols, triols, and tetrols obtained by the alkoxylation of water, ammonia, ethylene, glycol, propylene glycol, trimethylolpropane, aniline, ethanolamine, ethylene diamine, and the like; the polyester diols obtained from the reaction of dibasic carboxylic acids such as succinic, adipic, suberic, azelaic, phthalic, isophthalic, and the like with alkylene glycols and oxyalkylene glycols to form the corresponding polyalkylene, and polyoxyalkylene ester diols or copolymers thereof; polyester polyols derived from crude reaction residues and scrap polyester resin sources by their transesterification with low molecular weight glycols; and the vinyl-resin reinforced propyleneoxy-ethyleneoxy capped diols and triols, particularly those polyethers reinforced with polyacrylonitrile.

The proportions of polyol employed when making the polyisocyanurate resin will always be less than stoichiometric for reaction with respect to the isocyanate. Advantageously, the proportions will be such that the isocyanate equivalents to hydroxyl equivalents will fall within a range of from about 20:1 to 1.5:1, preferably from about 10:1 to about 2:1.

High strength composites can also be prepared by the present process wherein the RIM injected resin is primarily polyurethane forming. This is readily accomplished using all the same ingredients and process steps described herein but simply adjusting the above isocyanate/hydroxyl equivalent values to those which will result in polyurethane formation. Accordingly, isocyanate to hydroxyl equivalents from about 0.85:1 to about 1.3:1, preferably from about 0.95:1 to about 1.15:1 will provide the desired polyurethane resin.

The trimerization catalyst employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329; and the patents cited supra which disclosures are already herein incorporated.

Typical catalyst classes are the glycine salts and tertiary amine trimerization catalysts and alkali metal carboxylic acid salts disclosed in the above patents and mixtures of the various types of catalysts. Preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

The total quantity of catalyst, including mixtures thereof, in parts by weight per equivalent of polyisocyanate, can be determined easily by trial and error for any formulation in accordance with the present invention. Advantageously, the catalyst is employed within a range of about 0.1 parts to about 20 parts by weight per equivalent of polyisocyanate, preferably, from about 0.5 parts to about 10 parts.

Optionally, any of the urethane catalysts known in the art can be employed in catalytic amounts in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dubutyltin didodecylmercaptide, dibutyltin bis(isooctylthioglycolate), and the like; triethylamine, triethylenediamime, N,N,N',N'-tetramethylethylenediamine, N-methylmorpholine, N,N-dimethylcyclohexylamine, and the like, and mixtures of the above in any combination.

Although it is not an essential requirement in the process of the present invention, it is preferred that the molds be at a temperature above ambient room temperatures when they receive the resin forming ingredients. Advantageously, the mold temperatures fall within the range of from about 85° C. to about 120° C. Preferably, the mold temperature is from about 100° C. to about 110° C.

In connection with the molding conditions per se, as noted above the pressure must be maintained for a period of time at least until gelation of the resin has occurred. Generally speaking, as the mold temperature is increased, the time to gelation is decreased. Accordingly, the time during which the pressure is maintained can be decreased. Notably, it is advantageous to maintain the pressure for a period of from about 0.5 to about 4 minutes, preferably from about 1 to about 2.5 minutes. Thereafter the mold can be vented and the part removed.

In an optional embodiment the resin employed can be filled or reinforced in order to provide RRIM articles. The fillers can be any of the conventional materials used in the art. Typically, these include flaked or milled glass, titanium dioxide, calcium carbonate, talc, carbon black, powdered gypsum, natural clays such as kaolin, china clay, chopped rubber scrap, natural silica, and the like.

The fillers can be used in proportions of from about 1 to about 30 percent by weight based on the polyisocyanurate resin forming ingredients, and, preferably, from about 5 to about 15 percent by weight.

Other optional additives can be employed in the resin forming ingredients. Typical of such additional components are wax lubricants, antioxidants, internal mold release agents, flame retardants, colorants, and the like. Typical but non-limiting flame retardant additives are the phosphorus containing flame retardants including those having active hydrogen reactivity (hydroxyl and amine groups) such as dibromoeopentyl glycol, tris(2-chloroethyl)phosphate, tris(2-chloropropyl)phosphate, tris(2,3-dibromopropyl)phosphate, tri(1,3-dichloroisopropyl)phosphate, and the like.

The molded composites prepared in accordance with the present process, as noted above, achieve highly unexpected low void contents. While it would be expected that the application of pressure to the mold would result in better mold packing, it was highly unexpected to find that the fibrous mats can be so readily wetted out by the present procedures. Surprisingly, the surfaces of parts are much smoother than comparable parts molded in accordance with the art as measured by surface variability in inches (see Example 1 below).

The high strength composites produced by the present process are characterized by the minimum flexural moduli set forth above. Generally speaking, it falls within the range of from about 1,000,000 psi to about 4,000,000 psi. Their general physical properties are excellent.

The molded products can be used as structural members in vehicles, including under-the-hood parts, bumper beams, seat backs, interior trim panels, load-bearing floors, instrument panels, and the like; in the manufacture of appliances, furniture, building construction panels, sporting goods equipment such as shin guards, chest protectors, and the like.

The following examples describe the manner and process of making and using the invention and set forth the best mode contemplated by the inventors of carrying out the invention but are not to be construed as limiting.

Example 1

The following experiment describes the RIM preparation of high strength composites (runs 1 to 3) in accordance with the present invention and comparison samples (comparison runs 1 to 4 inclusive) not so in accordance.

A Krauss-Maffei PU-80 RIM machine is employed in all the runs. One tank of the RIM machine is charged with the A side ingredients at 80° F. comprising a liquefied form of 4,4'-methylenebis(phenyl isocyanate) in which a portion of the isocyanate groups have been converted to carbodiimide (I.E.=about 143) and DER®330, a bisphenol A-epichlorohydrin liquid epoxy resin of epoxide, eq. wt. about 182 to 189 (supplied by The Dow Chemical Co., Midland, Mich.). The isocyanate and epoxide are present in the proportions by weight of 144 parts and 8 parts respectively. A second tank is charged with the B side ingredients at 80° F. comprising the proportions in parts by weight of 65 parts of a 50/50 w/w mixture of a 400 molecular weight polyoxyethylene glycol and a 425 molecular weight polyoxypropylene glycol and 1.7 parts of Dabco 33LV [33% solution of 1,8-diazabicyclo(2.2.2.)octane in dipropylene glycol, supplied by Air Products, Allentown, PA]. The 1.7 parts of Dabco is employed for run 1 and comparison runs 1 and 2. This proportion is adjusted to 0.5 parts for all the other runs. Metering pumps from each tank are used to deliver the A and B ingredients in the above proportions into the impingement mixing head of the RIM machine attached to a center gated aluminmum mold measuring 36"×16"×3/16". The mold cover is equipped with a conical reservoir having a volume of about 7.5 percent of the mold volume proper, i.e. about 7.75 cu.-in. The apex of the conical reservoir is fitted with a three-way valve allowing for the immediate switching between closure, vacuum source or pressure source of nitrogen. The juncture between mold and cover is fitted with rubber gasketing capable of withstanding pressure/vacuum conditions. Prior to mold assembly, the appropriate number of 2 oz./sq. ft. fiber glass mats are cut to size just to fill the mold and laid flat one on top of the other.

For the runs 1, 2, and 3 of the invention, the mold is secured and a vacuum is drawn through the reservoir valve, then the valve is closed. The RIM resin ingredients are shot into the evacuated mold in sufficient quantity to fill the mold and reservoir completely. The shot time to achieve this with the throughput involved is about 3.45 seconds. Immediately upon shot completion, the reservoir valve is turned to the pressurizing mode before resin gelation can occur. This results in at least about half of the resin in the reservoir being forced back into the mold. Mold temperature is 200° F. and demold time after pressurizing is 2 minutes. The number of mats, vacuum, and pressure conditions are set forth in Table I.

For the comparison runs 1 to 4 noted in Table I, mold and reservoir filling was the same as above but normal mold venting is employed without pressure. Comparison run 2 does employ a vacuum step.

In run 1 and comparison runs 1 and 2, three fiber glass mats are employed. Run 1 is notable for having a much lower void volume than its comparison runs of 5.8 and 4.6%. The use of vacuum in comparison 2 does help slightly in void volume reduction but certainly not to the extent of run 1. Additionally, flexural strength and lower water pick-up properties are improved in run 1 over comparison 1 and 2.

In the four mat moldings, void content of run 2 is reduced over comparison run 3 with comparable flexural strength between the samples but at a lower overall glass content for run 2. Surface smoothness of the molding in Run 2 is also superior to its comparison run. In the six mat moldings, again lower void volume and greater surface smoothness is observed for run 3 over comparison 4. Flexural strength and heat distortion properties are also improved in run 3. Wet flex strength is somehwat lower in run 3.

TABLE I

| | \multicolumn{7}{c}{Run} |
| --- | --- | --- | --- | --- | --- | --- | --- |
| | 1 | Comp. 1 | Comp. 2 | 2 | Comp. 3 | 3 | Comp. 4 |
| Number of mats[1] | 3 | 3 | 3 | 4 | 4 | 6 | 6 |
| Molding conditions: | | | | | | | |
| Vacuum, mm. Hg. | 4 | none | 4 | 4 | none | 4 | none |
| Pressure, psig $N_2$ | 150 | none | none | 150 | none | 150 | none |
| Properties: | | | | | | | |
| Glass content (wt. %)[2] | 32.5 | 32.5 | 33.9 | 40.9 | 45.3 | 58.9 | 59.0 |
| Void volume (%)[3] | 1.9 | 5.8 | 4.6 | 0.5 | 2.6 | 0.4 | 3.4 |
| Specific gravity | 1.47 | 1.41 | 1.44 | — | — | — | — |
| Flexural str., psi | 40,900 | 37,800 | 37,600 | 53,300 | 52,100 | 60,100 | 55,200 |
| Flexural mod., psi | 1,264,000 | 1,124,000 | 1,145,000 | 1,702,000 | 1,652,000 | 2,182,000 | 1,960,000 |
| Wet flex. str. (5 hr. boil), psi[4] | 35,100 | 34,300 | 34,200 | — | — | 43,500 | 44,800 |
| Wet flex mod. (5 hr. boil), psi[4] | 1,088,400 | 1,064,800 | 1,125,100 | — | — | — | — |
| Wt. % water absorbed[4] | 1.24 | 1.47 | 1.66 | — | — | — | — |
| Tensile str., psi | 22,050 | 21,130 | 22,180 | 34,100 | 33,500 | — | — |
| Izod impact strength[5] ft-lb/in. | 9.4 | 8.8 | 9.8 | 11.4 | 12.2 | 14.0 | 14.0 |
| HDT (264 psi), °C.[6] | 203 | 219 | 206 | 228 | 219 | 266 | 233 |
| Surface Variability[7], | — | — | — | 0.6 | 0.9 | 1.4 | 2.1 |

TABLE I-continued

| | Run | | | | | | |
|---|---|---|---|---|---|---|---|
| | 1 | Comp. 1 | Comp. 2 | 2 | Comp. 3 | 3 | Comp. 4 |
| inches × $10^{-3}$ | | | | | | | |

Footnotes to Table I:
[1] Mats are 2 oz/sq. ft. continuous strand fiber glass mats bonded together by a polyester resin and supplied under the designation M-8610 by Owens Corning Fiberglass.
[2] Glass content in molded part determined by ashing weighed 1" × 1" samples ($W_s$) at 450° C. in a muffle furnace for at least 16 hours, determine polymer weight removed ($W_p$), thus obtain % glass = $\frac{W_s - W_p}{W_s} \times 100$.

[3] % void volume in molded part determined from $\frac{V_a - V_T}{V_a} \times 100$ where $V_a$ is actual measured volume and $V_T$ is the theoretical volume determined by $W_s$ (sample weight)/calculated specific gravity of the 1" × 1" samples of the part knowing the specific gravity of the glass and polymer.
[4] Wet flex str. in molded part determined by measuring flexural strength by ASTM D-790 after an appropriate exposure to water: boiling water for 5 hours.
[5] Izod impact determined in accordance with ASTM Test Method D-256-56.
[6] HDT (heat deflection temperature) as determined in accordance with ASTM Test Method D648-56.
[7] Surface variability (Ra) is a measure of surface roughness in inches determined as the average height of a large number of surface troughs above a median line over a set distance of the surface as measured by the stylus or pick-up of a variable reluctance type transducer; readout is by digital display and/or chart recorder; typical instrument employed is the Surtronic 3 supplied by Rank Taylor Hobson, Leicester, England.

Example 2

Using the same apparatus and procedures and resin ingredients described in Example 1 above a high strength composite (run 4) in accordance with the present invention and a comparison high strength composite (comp. 5) are prepared.

The reinforcement varied from Example 1 by consisting of one of the M-8610 continuous strand fiberglass mats sandwiched between an upper and a lower bonded chopped fiber glass mat. The comparison 5 employed the conventional vented molding procedure and both demold times are 1.5 minutes. The data set forth in Table II shows the lower void content, better flexural strength and smoother surface for runs 4 over comp 5.

Significantly, the molded part of run 4 is translucent, whereas comparison 5 is white signifying the occlusion of trapped air in the molded resin.

TABLE II

| Run | 4 | Comp. 5 |
|---|---|---|
| Number of mats[1] | 3 | 3 |
| Molding conditions: | | |
| Vacuum, mm. Hg. | 4 | none |
| Pressure, psig $N_2$ | 150 | none |
| Properties | | |
| Glass content (wt. %) | 28.2 | 32.7 |
| Void volume (%) | 1.1 | 5.8 |
| Flexural str. (psi) | 49,400 | 43,100 |
| Flexural mod. (psi) × $10^3$ | 1,511 | 1,326 |
| Wet flex. str. (psi) | 41,700 | 39,200 |
| Wet flex. mod. (psi) | 1,305 | 1,328 |
| Tensile str. (psi) | 18,600 | 21,200 |
| Tensile mod. (psi) × $10^3$ | 1,425 | 1,443 |
| Izod Impact Strength ft-lb/in. | 8.3 | 8.7 |
| HDT (264 psi) °C. | 181 | 189 |
| Surface variability inches × $10^{-3}$ | 0.7 | 4.0 |
| Appearance | translucent | white |

Footnote to Table II:
[1] The reinforcement package for both run 4 and comp. 5 is a three mat system consisting of two 1.5 oz/ft$^2$ chopped fiber glass strand mats bonded by polyester resin supplied under the designation M-127 by Fiber Glass Reinforcements Division, Certainteed Corporation, which are separated by one M-8610 mat described in Example 1 above.

Example 3

Using the same apparatus and procedures described in Example 1 above a high strength composite (run 5) of the invention and comparison run 6 are prepared. The resin formulation differed only in employing the catalyst at the 0.5 part proportions. The shot and demold times are 3.45 seconds and 2 minutes, respectively. The reinforcement package for both runs is a three mat system consisting of a 12"×15" piece of woven nylon fiber mat supplied under the designation Compet N (IR-69-LO-12×17-3) by Allied Chemical on the mold bottom with two of the M-8610 fiber glass mats on top.

Run 5 run under 4 mm. Hg. prior to the RIM resin shot followed immediately by 150 psig of nitrogen pressure provides a translucent part with a smooth surface (surface profilometer shows variability measurement of 0.0006 inch. Comparison run 6 with no vacuum nor pressure and conventionally vented at both ends of the mold (in fiber direction) provides an opaque white part with a surface variability of 0.0015 inch. A clear visual difference exists between the parts.

Example 4

Using the same apparatus and procedures described in Example 1 above a polyisocyanurate high strength composite (run 6) of the invention and comparison run 7 are prepared. The resin formulation was the same as Example 1 with shot time of 2.95 seconds and 2 minute demold of the 200° F. mold. The reinforcement package consists of the seven fiber glass mat arrangement set forth in Footnote 1 to Table III.

Run 6 of the invention employs the 4 mm. vacuum/150 psig pressure, whereas comp. 7 is simply carried out in the conventional venting procedure. In spite of such high glass content (64.1 wt. %) run 5 provided a molded part with a void volume of 1.4% compared with 5.7% for comp. 7. In fact, all physical property measurements set forth in Table III show the superiority of run 6 over comparison 7 combined with a much smoother part as reflected in the surface variability measurements.

TABLE III

| Run | 6 | Comp. 7 |
|---|---|---|
| Number of mats[1] | 7 | 7 |
| Molding conditions: | | |
| Vacuum, mm. Hg. | 4 | none |
| Pressure, psig $N_2$ | 150 | none |
| Properties: | | |
| Glass content (wt. %) | 64.1 | 59.1 |
| Void volume (%) | 1.4 | 5.7 |
| Specific gravity | 1.83 | 1.71 |
| Flexural str., psi[2] | 55,115 | 43,950 |
| Flexural mod., kpsi[2] | 2,061 | 1,355 |

TABLE III-continued

| Run | 6 | Comp. 7 |
|---|---|---|
| Izod Impact[2] ft-lb/in. | 44.0 | 36.6 |
| HDT (264 psi) °C. | 257 | 233 |
| Surface variability inches × 10$^{-3}$ | 0.4 | 2.0 |

Footnotes to Table III:
[1]The reinforcement package for both molded parts is a layer of 7 mats consisting of MCKCKCM where M represents the 2 oz/ft$^2$ fiber glass mats M-8610 described in Example 1; C represents 2 oz/ft$^2$ stitched unidirectional fiber glass roving oriented at 0° supplied under the designation A-1012 by Cofab Tuscaloosa, AL; and K represents 1.7 oz/ft$^2$ stitched unidirectional fiber glass roving oriented at 90° supplied under the designation D-156 by Knytex, Inc., Seguin, TX.
[2]These flexural and impact tests conducted at 90° (perpendicular to A-1012; parallel to D-156).

We claim:

1. A process for the preparation of a high strength composite comprising fibrous reinforcing material impregnated with a reaction injection molded polyisocyanurate resin said process comprising:
   a. providing a mold containing said fibrous reinforcing material and said mold equipped with means for decreasing an overflow volume of polyisocyanurate resin forming ingredients received to a final volume of said ingredients wherein the increment between said final volume and said overflow volume is from about 2 percent to about 15 percent of said final volume;
   b. evacuating said mold;
   c. injecting into said evacuated mold said resin forming ingredients in an amount in excess of that required to fill said final volume thereby causing said overflow volume;
   d. pressurizing said mold to a pressure of from about 50 to about 300 psi prior to gelation of said resin forming ingredients thereby causing a decrease in at least a portion of said overflow volume; and
   e. maintaining said pressure at least until said gelation has occurred.

2. A process according to claim 1 wherein said overflow volume decreasing means is provided by a reservoir for receiving said overflow volume and having an inlet for applying a positive gas pressure to said mold via said reservoir thereby causing a decrease in at least a portion of said overflow volume to said final volume.

3. A process according to claim 1 wherein said overflow volume decreasing means is provided by a cylindrical reservoir for receiving said overflow volume and having a piston working in cooperation with said cylindrical reservoir for applying a positive pressure to said mold via said reservoir thereby causing a decrease in at least a portion of said overflow volume to said final volume.

4. A process according to claim 1 wherein said overflow volume decreasing means is provided by a mold having a movable closure said mold adapted to have its initial volume which also includes said overflow volume filled with said resin forming ingredients and thereafter compressing said ingredients to said final volume by mechanically compressing and moving said mold closure.

5. A process according to claim 1 wherein said evacuating step comprises a vacuum of from about 0.01 to about 50 mm of mercury.

6. A process according to claim 1 wherein said mold is at a temperature of from about 85° to about 120° C.

7. A process according to claim 1 wherein said fibrous reinforcing material comprises at least one fiber glass mat.

8. A process according to claim 7 comprising a plurality of fiber glass mats.

9. A process according to claim 7 additionally comprising at least one organic fiber mat.

10. A process according to claim 7 wherein the fiber glass content of said composite is from about 10 to about 70 percent by weight.

11. A process according to claim 1 wherein said polyisocyanurate resin forming ingredients comprise an aromatic polyisocyanate and less than a stoichiometric amount of at least one organic polyol.

12. A process according to claim 11 additionally comprising from about 1 to about 30 percent by weight of a filler.

13. A process for the preparation of a high strength composite comprising at least one fiber glass mat impregnated with a reaction injection molded polyisocyanurate resin said process comprising the steps of:
   a. providing a mold containing said at least one fiber glass mat and said mold equipped with a reservoir for receiving an overflow volume of polyisocyanurate resin forming ingredients and having an inlet for applying a positive gas pressure to said mold via said reservoir to decrease said overflow volume to a final volume of said ingredients wherein the increment between said final volume and said overflow volume is from about 2 percent to about 15 percent of said final volume;
   b. evacuating said mold and reservoir to a pressure of from about 0.01 to about 50 mm. of mercury;
   c. injecting into said evacuated mold polyisocyanurate resin forming ingredients comprising an aromatic polyisocyanate, less than a stoichiometric amount of at least one polyol and an isocyanate trimerization catalyst in an amount in excess of that required to fill said final volume thereby causing said overflow volume in said reservoir;
   d. pressurizing said mold prior to gelation of said resin forming ingredients by applying a pressure of from about 50 to about 300 psi of nitrogen to said reservoir thereby causing a decrease in at least a portion of said overflow volume to said final volume; and
   e. maintaining said pressure at least until said gelation has occurred.

14. A process according to claim 13 wherein said mold contains a plurality of fiber glass mats.

15. A process according to claim 14 wherein said fiber glass content of said composite is from about 10 to about 70 percent by weight.

16. A process according to claim 15 wherein said aromatic polyisocyanate is a liquefied form of methylenebis(phenyl isocyanate) and the ratio of isocyanate to hydroxyl equivalents is from about 10:1 to about 2:1.

17. A process according to claim 16 wherein said vacuum and pressure are about 4 mm. mercury and about 150 psi, respectively.

* * * * *